Sept. 8, 1931.  H. V. DALGLIESH  1,822,726
COOLED LUBRICATING SYSTEM
Filed Sept. 23, 1930
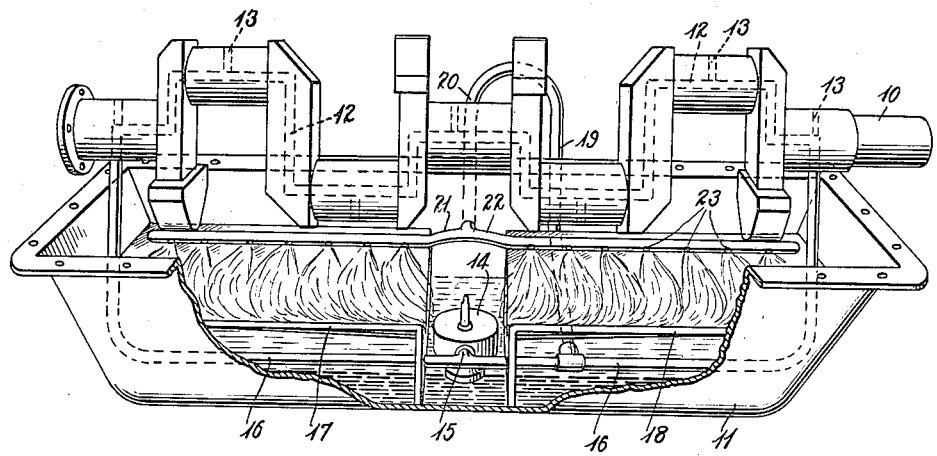
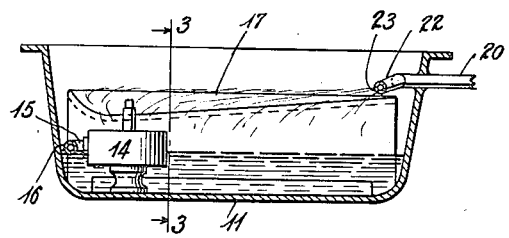
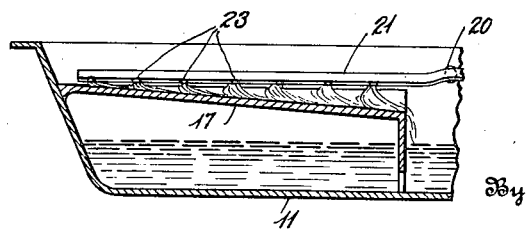
Inventor
Herbert V. Dalgliesh
By Brown & Phelps
Attorneys Patented Sept. 8, 1931

1,822,726

UNITED STATES PATENT OFFICE

HERBERT V. DALGLIESH, OF ATLANTA, GEORGIA, ASSIGNOR, BY MESNE ASSIGNMENTS, TO RESEARCH & DEVELOPMENT CORPORATION, OF ATLANTA, GEORGIA, A CORPORATION OF GEORGIA

COOLED LUBRICATING SYSTEM

Application filed September 23, 1930. Serial No. 483,945.

The invention relates to lubricating systems and has as an object the provision of means for cooling the oil by exposing the same to a current of air produced by the operation of a working part of the machine to which it is applied.

It is a further object of the invention to provide a lubricating system particularly adaptable to machines including a crankshaft having means for cooling the oil circulating in the system by exposing the same to currents of air produced by the revolution of the crankshaft.

It is a further object of the invention to provide a lubricating system having means to cool the oil by exposing the same in a thin sheet to a current of air produced by revolution of a working part of the machine to which the system is applied and also having means to supply a large proportion of the cooled oil to the intake of the pump provided to cause circulation of the oil.

Further objects of the invention will appear from the following description when read in connection with the accompanying drawings showing an illustrative embodiment of the invention and wherein:—

Fig. 1 is a perspective view diagrammatic in character showing the system applied to a machine embodying a crankshaft;

Fig. 2 is a central vertical section of the sump of Fig. 1; and Fig. 3 is a vertical section on line 3—3 of Fig. 1.

As shown the crankshaft forming a portion of the machine is indicated at 10 and an oil sump as the lower portion of a crankcase is indicated at 11.

To cause the circulation of oil through the bearings of the machine, illustrated as the bearings of the crankshaft thereof, there is shown an oil duct 12 passing longitudinally through the crankshaft and cranks thereof having perforations 13 to conduct the oil to the surfaces of the bearings in the usual manner.

A pump for circulation of the oil is indicated at 14 located in the sump 11 and as indicated in Fig. 2 desirably at one side thereof for a reason to be explained.

To conduct oil from the output 15 of the pump there are shown pipes 16 indicated as conveying oil to each end of the crankshaft for uniformity of lubrication.

It is understood that the oil escaping from the bearings will be returned to the sump 11 by gravity and in the case of a crankshaft this escaping oil will be thrown by centrifugal force to the outer walls of the crankcase and therefore a large proportion of the oil will return to the sump by flowing down the walls of the case.

In accordance with the invention the shelves or septums 17, 18 are provided in the crankcase in the usual manner but modified in structure to fulfill the purposes of the invention.

To accomplish the cooling of the oil, there is shown a connection 19 to the pipe 16 in bypass of the bearings, the oil flowing to such bypass being returned to the crankcase as by means of pipe 20 which is shown as connecting to branches 21, 22 lying longitudinally of the crankcase and closely adjacent the upper edge of the shelves 17, 18.

The branches 21, 22 of the return pipe are shown as provided with a plurality of perforations or nozzles 23 delivering the oil from the bypass 19 upon the surface of the shelves where the streams thus delivered will spread out into sheets merging with each other and the surfaces of the shelves as indicated in Fig. 2 are formed to slope from the delivery point of the streams laterally of the shelves and also from the ends thereof toward the center where the pump 14 is located.

The combined cross sectional area of the nozzles is considerably greater than the cross sectional area of pipe 19 and therefore the pressure of the oil escaping at each of these nozzles is very much diminished below the pressure existing in the pipe 19 by reason of which fact the speed of the oil delivered from the perforations will be slight and the flow of the oil sheets across the shelves will be sluggish.

The revolution of the crankshaft being at a high rate of speed provides a current of air of considerable velocity which impinging upon the sheets of oil produces a marked cooling effect upon the oil.

By reason of the fact that the oil is delivered from the shelves closely adjacent the intake of the pump 14, the flow of oil escaping to the sump down the walls of the sump will be considerably retarded in its flow in the sump to the pump intake, and the pump 14 will be fed largely by the cooled oil which will be fed to the bearings of the machine.

Tests carried out upon an automobile equipped with the invention show that the cooling effect thereof is material and that the oil fed to the bearings is at a considerably lower temperature than is the case when the same machine is tested equipped in the usual manner.

Minor changes may be made in the physical embodiment of the invention within the scope of the appended claims without departing from the spirit thereof.

I claim:

1. A lubricating system for machines comprising, in combination, means to circulate oil to the bearings of a machine, means to spread a portion of the oil circulated by said first named means in unconfined thin sheets in a position to be directly acted upon by currents of air generated by a moving part of the machine.

2. A lubricating system for machines comprising, in combination, a machine having a crankshaft, a sump below said crankshaft, a plate in said sump adjacent said crankshaft and spaced from the bottom of the sump, means to circulate oil through the bearings of said machine to be collected in said sump, means in bypass of said circulation to cool oil comprising means to spread said bypassed oil in thin sheets over said plate to be cooled by currents of air generated by said crankshaft.

3. A lubricating system for machines comprising, in combination, a machine having a crankshaft, a sump below said crankshaft, a plate in said sump adjacent said crankshaft and spaced from the bottom of the sump, means to circulate oil through the bearings of said machine to be collected in said sump, means in bypass of said circulation to cool oil comprising a conduit delivering to a plurality of spaced openings closely adjacent said plate whereby to spread the oil from said conduit in thin sheets upon the surface of said plate to be acted upon by currents of air generated by revolution of said crankshaft.

4. A lubricating system for machines comprising, in combination, a machine having a sump, a pump with its intake in said sump to circulate oil through the bearings of said machine to be collected in said sump, a plate located above the bottom of said sump and adjacent a moving part of the machine, said plate formed to conduct oil delivered to its surface to a position in said sump closely adjacent the intake of the pump, means to bypass a portion of the oil from said pump and to spread the same in thin sheets upon the surface of said plate to be cooled by currents of air generated by said moving part.

HERBERT V. DALGLIESH.